US007434949B2

(12) United States Patent
Imai

(10) Patent No.: US 7,434,949 B2
(45) Date of Patent: Oct. 14, 2008

(54) ILLUMINATION DEVICE

(75) Inventor: Toshio Imai, Miyagi-ken (JP)

(73) Assignee: Alps Electric Co. ,Ltd., Tokyo (JP)

( * ) Notice: Subject to any disclaimer, the term of this patent is extended or adjusted under 35 U.S.C. 154(b) by 0 days.

(21) Appl. No.: 11/679,674

(22) Filed: Feb. 27, 2007

(65) Prior Publication Data

US 2007/0201217 A1 Aug. 30, 2007

(30) Foreign Application Priority Data

Feb. 28, 2006 (JP) ............................ 2006-052770

(51) Int. Cl.
*G01D 11/28* (2006.01)

(52) U.S. Cl. ............................ 362/26; 362/23; 362/29; 362/86; 362/800; 362/488

(58) Field of Classification Search .................. 362/26, 362/29, 86, 23, 488, 489, 800
See application file for complete search history.

(56) References Cited

U.S. PATENT DOCUMENTS 5,093,764 A * 3/1992 Hasegawa et al. ............ 362/29
6,210,010 B1 * 4/2001 Pontetti et al. ................ 362/24
2006/0072300 A1 * 4/2006 Hayashi ....................... 362/29
2007/0103884 A1 * 5/2007 Popowich et al. ............ 362/29

FOREIGN PATENT DOCUMENTS

JP 2004-228022 8/2004

* cited by examiner

*Primary Examiner*—Stephen F. Husar
*Assistant Examiner*—Jessica L McMillan
(74) *Attorney, Agent, or Firm*—Brinks Hofer Gilson & Lione

(57) ABSTRACT

An illumination device includes a control knob having a display portion, a tubular case combined with a back side of the control knob, a light guide plate attached to seal an upper opening of the tubular case, and LEDs disposed at a lower opening of the tubular case. Light emitted from the LEDs is applied to the display portion through the light guide plate. A plurality of retaining projections and a plurality of push-up projections are provided on an inner surface of the tubular case adjacent to the upper opening. An upper surface of an outer edge of the light guide plate is retained by lower ends of the retaining projections, and a lower surface of the outer edge is pushed up by upper ends of the push-up projections so that the light guide plate is held inside the tubular case while being bent upwardly.

6 Claims, 5 Drawing Sheets

ILLUMINATION DEVICE

This application claims the benefit of priority under 35 U.S.C. § 119 to Japanese Patent Application No. 2006-052770, filed Feb. 28, 2006, which is hereby incorporated by reference in its entirety.

BACKGROUND OF THE INVENTION

1. Field of the Invention

The present invention relates to an illumination device that illuminates a display portion of a control knob provided in, for example, an on-vehicle control panel.

2. Description of the Related Art

In control panels used in on-vehicle air conditioning systems and audio systems, an operator (occupant) selectively presses or rotates a plurality of control knobs, and an inherent function assigned to the control knob is thereby performed. Normally, the control knobs have display portions corresponding to their respective assigned functions. An illumination device is mounted so as to allow the display portions to be viewed even in an unlit environment.

Japanese Unexamined Patent Application Publication No. 2004-228022 discloses an illumination device in which light sources (LEDs) are provided in a tubular case disposed on the back side of a control knob, and in which a flat light guide plate is fixed to holding bars integrally provided with an upper end of the tubular case. Light emitted from the light source is diffused by the light guide plate and is then applied to the back side of the control knob, thereby displaying a design, such as characters and images, on a top face of the control knob.

The above-described publication does not teach a specific means for fixing the light guide plate to the holding bars of the tubular case. For example, when an adhesive, which is known as a general fixing means, is used, a step of applying the adhesive is troublesome, and the adhesive strength declines with time. Accordingly, as a means for fixing the light guide plate without using an adhesive, a holding structure can be adopted in which a stepped portion is provided at an upper end of an inner surface of the tubular case, and projections are provided on the back side of the control knob. The control knob is combined with the tubular case by snap fitting so that the outer edge of the light guide plate is clamped by the stepped portion of the tubular case and the projections of the control knob.

In this holding structure, it is necessary to properly set the distance between the stepped portion and the projections in consideration of the thickness of the light guide plate. However, since the control knob having the projections is combined with the tubular case having the stepped portion by snap fitting, if the distance between the stepped portion and the projections is smaller than the thickness of the light guide plate within the dimensional tolerance, it is quite difficult to snap-fit the control knob and the tubular case. For this reason, the distance therebetween needs to be sufficiently larger than the thickness of the light guide plate. As a result, the light guide plate rattles between the stepped portion and the projections, thus causing an abnormal noise during driving.

SUMMARY OF THE INVENTION

The present invention has been made in view of these circumstances of the related art. An object of the invention is to provide an illumination device in which a light guide plate can be easily and reliably held in a tubular case.

In order to achieve the above object, an illumination device according to an aspect of the present invention includes a) a control knob having a display portion, b) a tubular case disposed on a back side of the control knob, c) a light guide plate attached to close or seal an upper opening of the tubular case, and d) a light source disposed at a lower opening of the tubular case. Light emitted from the light source is applied to the display portion through the light guide plate. A plurality of retaining projections and a plurality of push-up projections are provided on an inner surface of the tubular case adjacent to the upper opening. An upper surface of an outer edge of the light guide plate is retained by lower ends of the retaining projections, and a lower surface of the outer edge of the light guide plate is pushed up by upper ends of the push-up projections so that the light guide plate is held inside the tubular case while being bent upwardly.

In the illumination device having the above-described configuration, the flat light guide plate is convexly bent by being retained by the retaining projections and the push-up projections provided on the inner surface of the tubular case. The light guide plate is held while being elastically urged against the retaining projections and the push-up projections by a bending force. Therefore, the light guide plate can be easily mounted in the tubular case without using an adhesive. Moreover, rattling of the light guide plate is prevented, and a reliable holding structure can be achieved.

Preferably, a height of an imaginary plane linking the upper ends of the push-up projections is larger than a height obtained by subtracting a thickness of the light guide plate from a height of an imaginary plane linking the lower ends of the retaining projections.

While the upper opening of the tubular case may have any shape, when it is rectangular, it is preferable that the push-up projections be provided at the centers of a pair of push-up inner walls opposing each other at the upper opening, and that the retaining projections be provided on a pair of retaining inner walls opposing each other at the upper opening and extending orthogonally to the push-up inner walls.

Preferably, upper surfaces of the retaining projections are tapered and inclined downwardly. In this case, the outer edge of the light guide plate can be easily put below the retaining projections along the tapered upper surfaces.

Preferably, a stepped portion continuously extends along an inner surface of the tubular case along an inner periphery of the tubular case, and the push-up projections are provided on the stepped portion. In this case, when the light guide plate is put in the tubular case from the upper opening, the outer edge of the light guide plate comes into contact with an upper surface of the stepped portion, and the light guide plate is prevented from being inserted further. Therefore, the light guide plate can be easily mounted between the retaining projections and the push-up projections of the tubular case.

Preferably, a plurality of punched holes are provided in the tubular case, which extend from an outer surface of the tubular case to lower surfaces of the retaining projections. Outer open ends of the punched holes are covered with the control knob when the control knob is snap-fitted on the tubular case. In this case, a tubular case having an undercut shape can be easily molded by using the punched holes. Moreover, since the punched holes provided in the outer surfaces of the tubular case are closed or sealed by the control knob, dust, moisture, and the like are prevented from entering the tubular case through the punched holes.

In the illumination device according to the aspect of the present invention, the light guide plate interposed between the light source and the display portion is convexly bent by being retained by the retaining projections and the push-up projections provided on the inner surface of the tubular case, and the light guide plate is held while being elastically urged against the retaining projections and the push-up projections by a bending force. Therefore, the light guide plate can be easily mounted in the tubular case without using an adhesive. Moreover, rattling of the light guide plate is prevented, and a reliable holding structure can be achieved.

DESCRIPTION OF THE PREFERRED EMBODIMENTS

An illumination device according to an embodiment of the present invention will be described below with reference to FIGS. 1 to 5. In these figures, the illumination device is applied to a control panel.

Referring to these figures, a housing 1 serving as an outer shell of the control panel is provided in, for example, an instrument panel or a central console box of a vehicle. The housing 1 includes a relatively large opening 1*a*, and a plurality of through holes 1*b* provided around the opening 1*a*. A printed circuit board 2 is attached to a rear end of the housing 1. Multiple LEDs 3 and push switches 4 are mounted on the printed circuit board 2 such that the LEDs 3 oppose the opening 1*a* and the through holes 1*b*, and the push switches 4 oppose the through holes 1*b*. The LEDs 3 opposing the opening 1*a* function as light sources for backlighting an LCD that is provided in the opening 1*a*.

Figure 2:
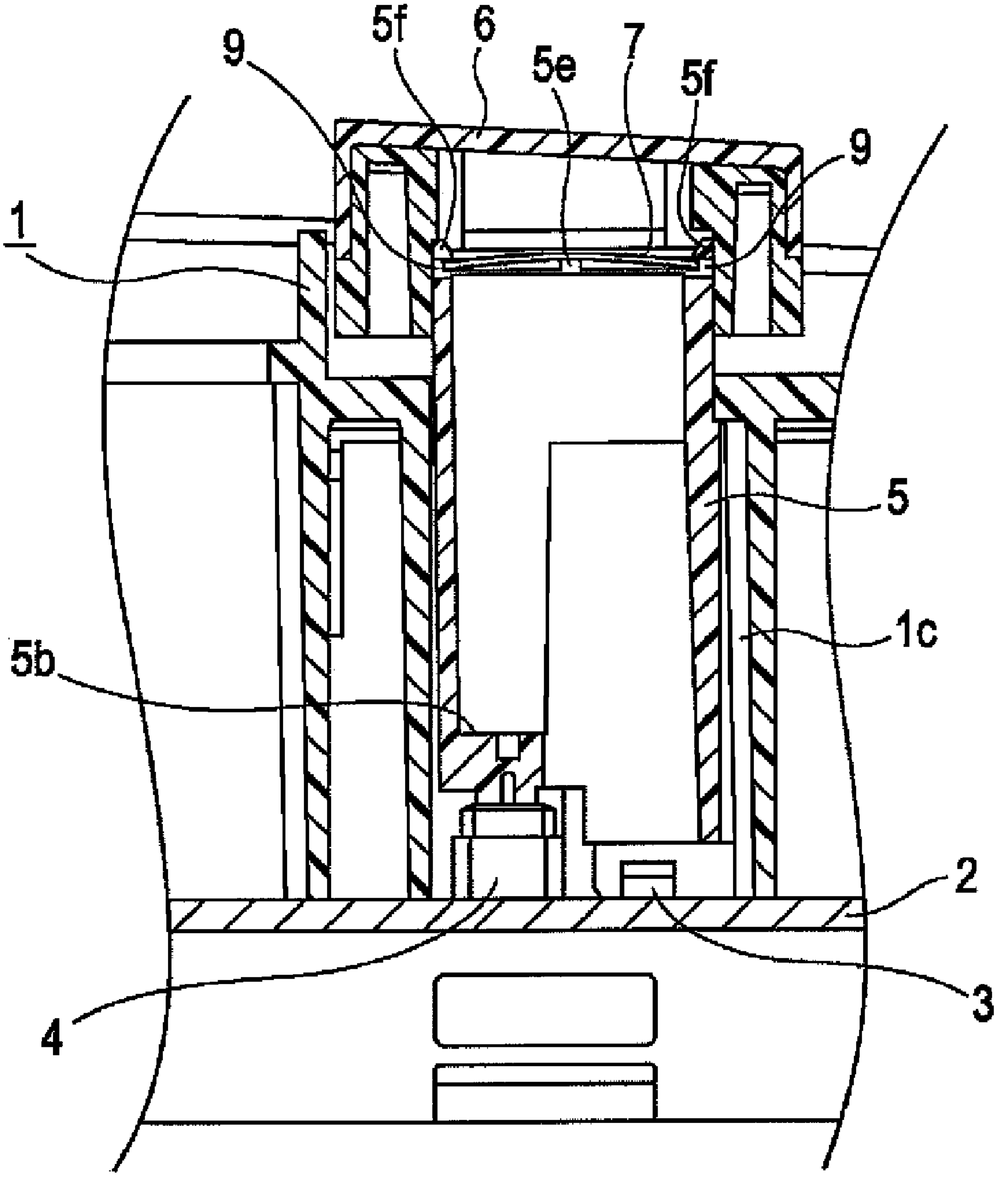
FIG. 2 is a cross-sectional view of the control panel, take along one direction.
Figure 3:
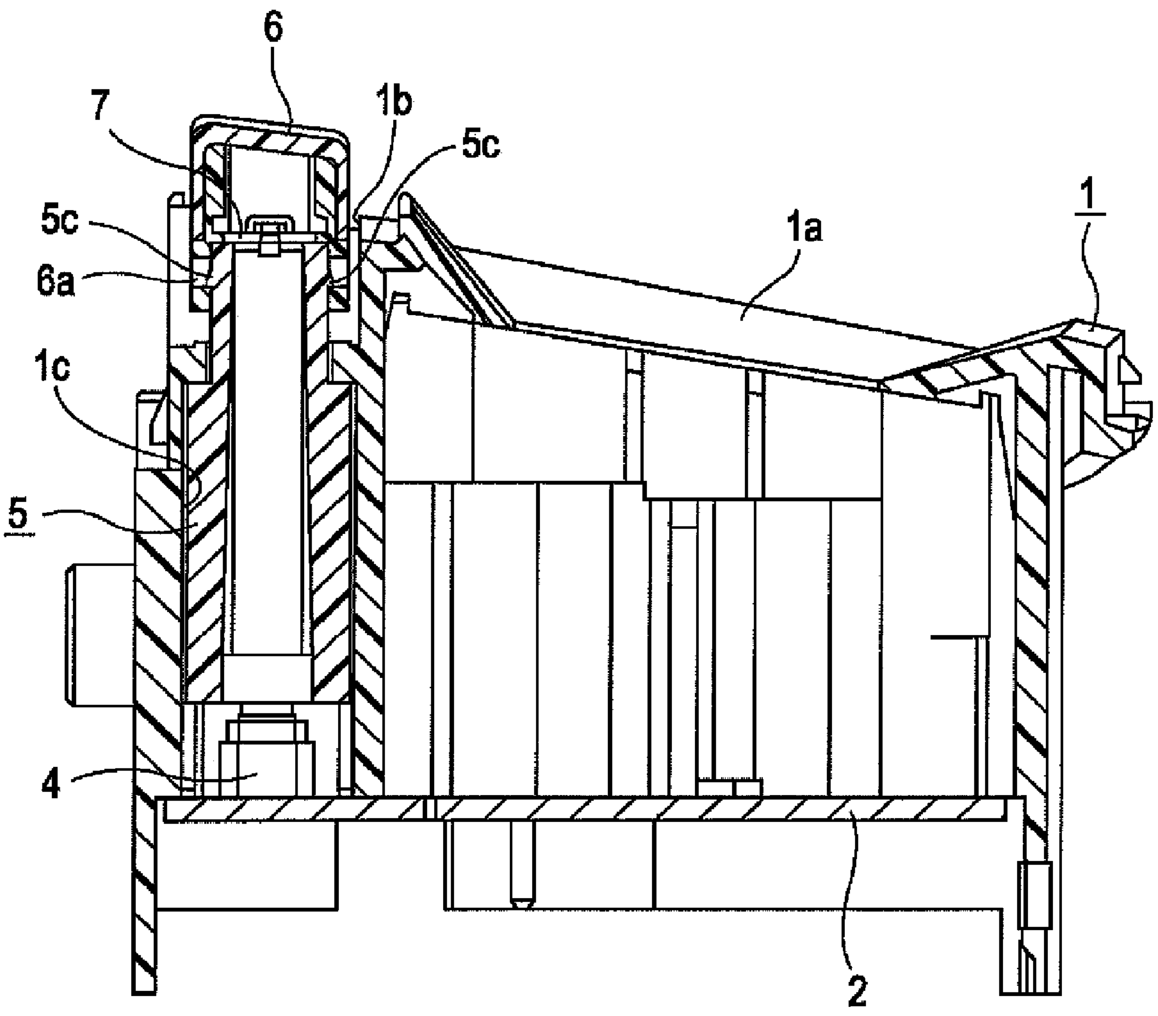
FIG. 3 is a cross-sectional view of the control panel, taken along another direction.
Figure 4:
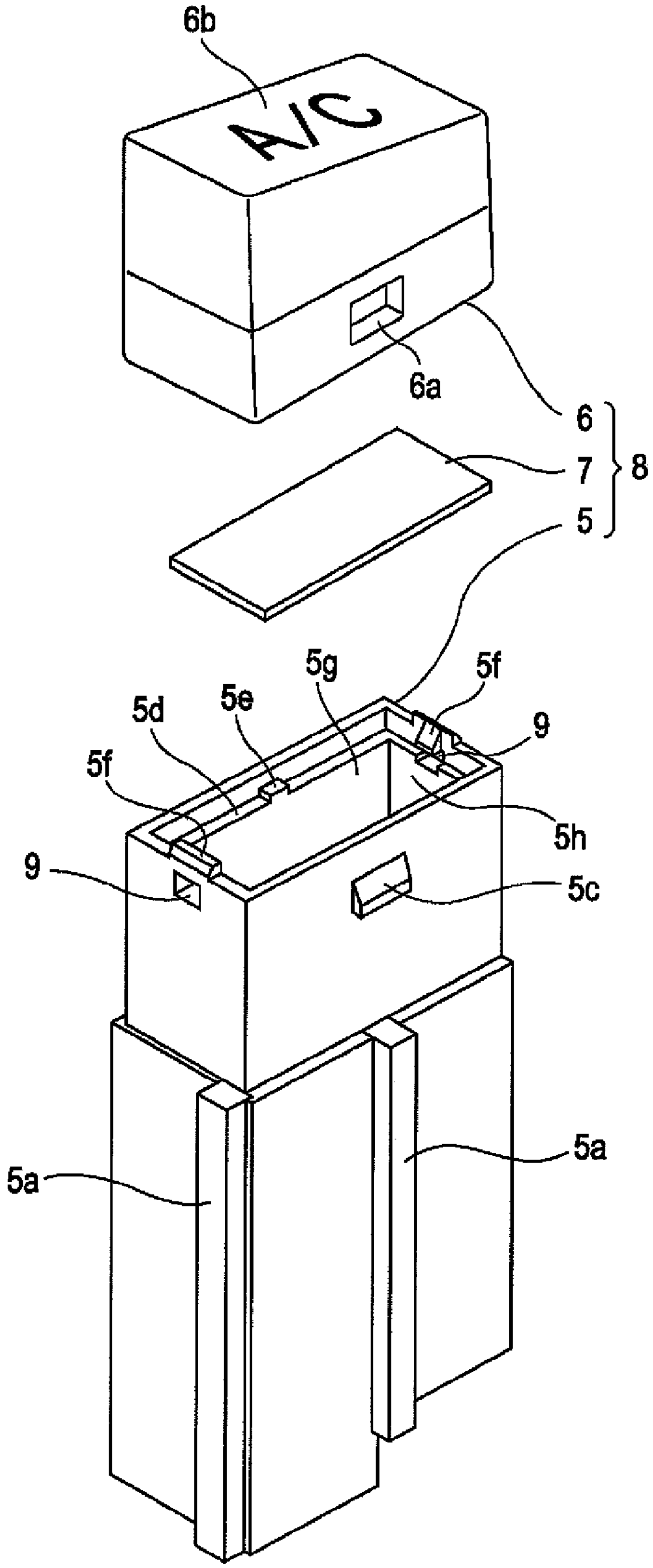
FIG. 4 is an exploded perspective view of a control knob, a light guide plate, and a tubular case provided in the control panel.

A tubular case 5 made of synthetic resin is provided in each of the through holes 1*b* of the housing 1. The tubular case 5 has an outer shape like a rectangular parallelepiped, and is hollow so as to have rectangular apertures at both upper and lower (front and rear) ends thereof, respectively. As shown in FIG. 4, a plurality of guide projections 5*a* linearly extending in the vertical direction are provided on an outer surface of the tubular case 5, and are slidably fitted in guide grooves 1*c* provided in an inner surface of the through hole 1*b*. Upper end faces of the guide projections 5*a* are in contact with upper ends of the corresponding guide grooves 1*c*, thereby preventing the tubular case 5 from falling off the through hole 1*b*. A driving portion 5*b* for operating the corresponding push switch 4 is provided on a lower part of the inner surface of the tubular case 5, and the LED 3 disposed near the push switch 4 opposes the lower open end of the tubular case 5, as shown in FIG. 2.

Figure 1:
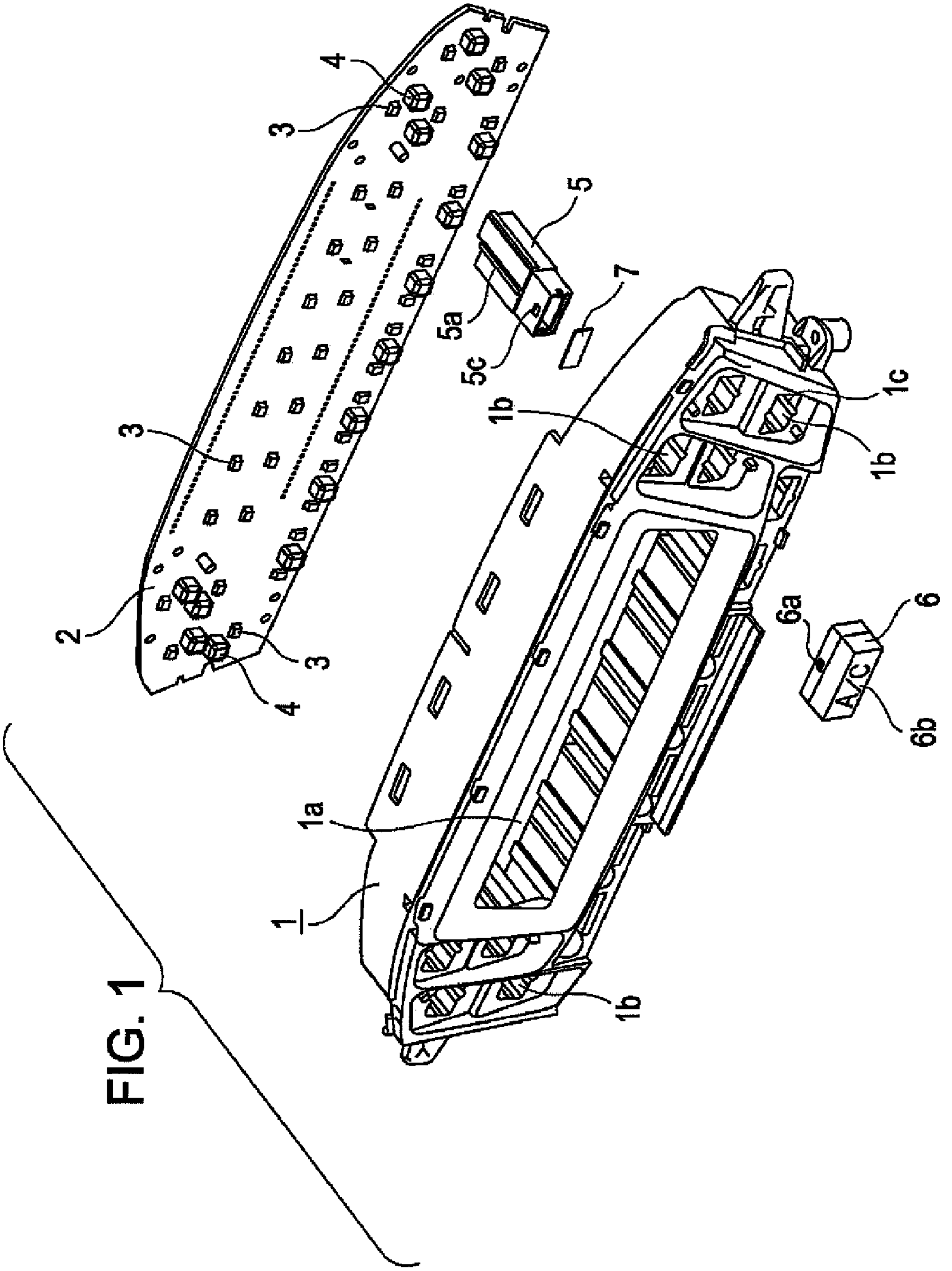
FIG. 1 is an exploded perspective view of a control panel to which an illumination device according to an embodiment of the present invention is applied.

Retaining claws 5*c* are respectively provided on upper portions of two long outer side faces, of the four side faces of the tubular case 5. A control knob 6 is snap-fitted on an upper end of the tubular case 5 by using the retaining claws 5*c*. Long outer side faces of the control knob 6 respectively have retaining holes 6*a* in which the retaining claws 5*c* are snap-fitted, and a display portion 6*b* is provided on a rectangular top face of the control knob 6. The display portion 6*a* corresponds to a function that is assigned to the corresponding control knob 6. While characters "A/C" indicating an air-conditioner function are provided on the control knob 6 shown in FIGS. 1 and 4, other characters, images, and the like are provided as display portions 6*b* on other control knobs 6. Each control knob 6 is formed by two-color molding, and includes a part formed of a light-shielding resin, such as ABS, and a part formed of a light-transmitting resin such as an acrylic or polycarbonate. The retaining holes 6*a* are provided in the light-shielding resin part. After molding, a light-transmitting colored coating and a light-shielding colored coating are sequentially applied on the light-transmitting resin part. A part of the upper light-shielding colored coating is removed by a laser or other methods, for example, so that white characters "A/C" are exposed from a black light-shielding coating in the display portion 6*b*. A light guide plate 7 is attached to the inner surface of the tubular case 5 so as to cover the upper opening. The tubular case 5, the control knob 6, and the light guide plate 7 constitute one controller unit 8. While only one controller unit 8 is shown in FIG. 1, in actuality, a plurality of controller units 8 are assembled in the housing 1 corresponding to the through holes 1*b*.

Figure 5:
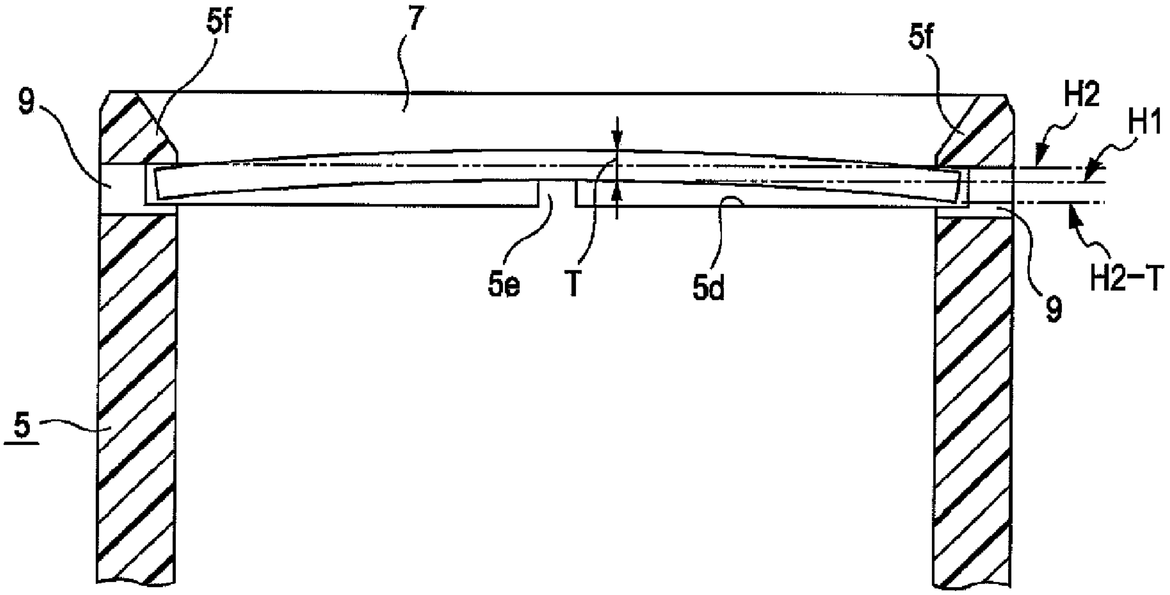
FIG. 5 is an explanatory view showing a structure for holding the light guide plate.

Each of the controller units 8 will now be described in detail. A stepped portion 5*d* is provided in an upper part of the inner surface of the tubular case 5, and continuously extends along the inner periphery of the tubular case 5. A portion of each side face of the tubular case 5 disposed higher than the stepped portion 5*d* and adjacent to the upper opening has a thickness less than the thicknesses of other portions. Push-up projections 5*e* are respectively provided at the centers of a pair of pressing inner faces 5*g* of the tubular case 5, which oppose each other at the upper rectangular opening and extend in the longitudinal direction. These push-up projections 5*e* project from an upper surface of the stepped portion 5*d* toward the upper opening. On the other hand, retaining projections 5*f* projecting inwardly are respectively provided at the centers of a pair of retaining inner faces 5*h* of the tubular case 5 that oppose each other at the upper rectangular opening and extend in the lateral direction. Upper surfaces of these retaining projections 5*f* are tapered and are inclined downwardly toward the stepped portion 5*d*. As shown in FIG. 5, the height H1 of an imaginary plane linking upper ends of the push-up projections 5*e* is larger than the height (H2−T) obtained by subtracting the thickness T of the light guide plate 7 from the height H2 of an imaginary plane linking lower ends of the retaining projections 5*f*. Punched holes 9 are respectively provided in upper portions of the two side faces of the tubular case 5 extending in the lateral direction. Upper ends of the punched holes 9 extend to the lower ends of the retaining projections 5*f* through the side faces of the tubular case 5. That is, the retaining projections 5*f* and the stepped portion 5 have an undercut shape, as viewed from the upper opening of the tubular case 5. Therefore, the retaining projections 5*f* are formed by a side core (not shown) that is movable perpendicularly to a mold opening direction of a molding die. The punched holes 9 correspond to the side core.

The light guide plate 7 is a rectangular light-diffusing plate in which a light-diffusing substance, such as pigment, is mixed in a light-transmitting resin. The outer size of the light guide plate 7 is slightly smaller than the size of the upper opening of the tubular case 5, but is slightly larger than the size defined by the inner surface of the stepped portion 5*d*. The thickness T of the light guide plate is slightly smaller than the opposing distance between the upper surface of the stepped portion 5*d* and the lower ends of the retaining projections 5*f*. As described above, the height H1 of the imaginary plane linking the upper ends of the push-up projections 5*e* is larger than the height (H2-T) obtained by subtracting the thickness T of the light guide plate 7 from the height H2 of the imaginary plane linking the lower ends of the retaining projections 5*f*. Therefore, when outer edges of the short sides of the light guide plate 7 are placed between the stepped portion 5*d* and the retaining projections 5*f*, they are retained by the lower ends of the retaining projections 5*f*. Simultaneously, lower surfaces of outer edges of the long sides of the light guide plate 7 are pushed up by the upper ends of the push-up projections 5*e*, and are bent upwardly, as shown in FIG. 5. Through a bending force, the light guide plate 7 is held in the upper part of the inner surface of the tubular case 5 while being elastically biased by the retaining projections 5*f* and the push-up projections 5*e*. This allows the light guide plate 7 to be easily mounted in the tubular case 5 without using an adhesive. Moreover, rattling of the light guide plate 7 is prevented, and a reliable holding structure is achieved.

When the above-described control knob 6 is snap-fitted on the tubular case 5 having the light guide plate 7, it closes the punched holes 9 of the tubular case 5, as shown in FIG. 2. Therefore, dust, moisture, and the like can be prevented from entering the tubular case 5 through the punched holes 9. When the light guide plate 7 is mounted, the outer edges of the light guide plate 7 can be easily put between the stepped portion 5*d* and the retaining projections 5*f* by using the tapered portions provided on the upper surfaces of the retaining projections 5*f* as guides. Further, since the outer edges of the light guide plate 7 come into contact with the upper surface of the stepped portion 5*d* and are thereby prevented from being further inserted, the light guide plate 7 will not fall in the tubular case 5 during mounting.

In the control panel having the above-described configuration, when an operator (occupant) presses an arbitrary control knob 6 exposed in the through hole 1*b* of the housing 1, an actuator of the corresponding push switch 4 is pressed down by the driving portion 5*b* of the tubular case 5 combined with the control knob 6, and an ON/OFF switch signal is output from the push switch 4 to a control circuit. According to this output signal, the control circuit performs the function assigned to the control knob 6. For example, when the control knob 6 on which characters "A/C" are provided as the display portion 6*b* is pressed, an input switching function for turning the air conditioner on or off, is performed.

In this case, since the display portion 6*b* on the top face of the control knob 6 is formed of a light-transmitting colored coating, the operator can recognize the function assigned to the control knob 6 by viewing the display portion 6*b* even when ambient illumination is not provided. Further, when the LEDs 3 are turned on at night or in a dark environment, such as a tunnel, light emitted from the LEDs 3 opposing the lower open end of the tubular case 5 is diffused when passing through the light guide plate 7 held in the upper part of the inner surface of the tubular case 5, is uniformly applied onto the back side of the control knob 6, and then comes outside only through the display portion 6*b* of the control knob 6. Therefore, the operator can view the display portion 6*b* even in a dark environment.

While the light guide plate 7 serving as a light-diffusing plate is held on the upper part of the inner surface of the tubular case 5, and light emitted from the LEDs 3 is diffused by the light guide plate 7 and is applied onto the display portion 6*b* of the control knob 6, a light guide plate having no light-diffusing function, such as a color filter, may be used.

While the push switch 4 is operated by pressing the control knob 6 in the above-described embodiment, the electrical component operated by the control knob 6 is not limited to the push switch 4. For example, a rotary electrical component can be operated by rotating the control knob.

What is claimed is:

1. An illumination device comprising:
a control knob having a display portion;
a tubular case disposed on a back side of the control knob;
a bendable light guide plate attached to seal an upper opening of the tubular case; and
a light source disposed at a lower opening of the tubular case,
wherein light emitted from the light source is applied to the display portion through the light guide plate,
wherein a plurality of retaining projections and a plurality of push-up projections are provided on an inner surface of the tubular case adjacent to the upper opening, and
wherein an upper surface of an outer edge of the bendable light guide plate is retained by lower ends of the retaining projections, and a lower surface of the outer edge of the bendable light guide plate is pushed up by upper ends of the push-up projections so that the bendable light guide plate is held inside the tubular case while being bent upwardly.

2. The illumination device according to claim 1, wherein a height of an imaginary plane linking the upper ends of the push-up projections is larger than a height obtained by subtracting a thickness of the light guide plate from a height of an imaginary plane linking the lower ends of the retaining projections.

3. The illumination device according to claim 1, wherein the upper opening of the tubular case is rectangular,
wherein the push-up projections are provided at the centers of a pair of push-up inner walls opposing each other at the upper opening, and
wherein the retaining projections are provided on a pair of retaining inner walls opposing each other at the upper opening and extending orthogonally to the push-up inner walls.

4. The illumination device according to claims 1, wherein upper surfaces of the retaining projections are tapered portions inclined downward.

5. The illumination device according to claim 1, wherein a stepped portion continuously extends on the inner surface of the tubular case along an inner periphery of the tubular case, and the push-up projections are provided on the stepped portion.

6. The illumination device according to claim 5, wherein a plurality of punched holes are provided in the tubular case so as to extend from an outer surface of the tubular case to lower surfaces of the retaining projections, and outer open ends of the punched holes are covered with the control knob when the control knob is snap-fitted on the tubular case.

* * * * *